(12) United States Patent
Kirrmann et al.

(10) Patent No.: US 9,484,738 B2
(45) Date of Patent: Nov. 1, 2016

(54) OPERATING A SUBSTATION AUTOMATION SYSTEM

(75) Inventors: Hubert Kirrmann, Daettwil (CH); Michael Obrist, Untersiggenthal (CH)

(73) Assignee: ABB Research Ltd., Zurich (CH)

(*) Notice: Subject to any disclaimer, the term of this patent is extended or adjusted under 35 U.S.C. 154(b) by 1439 days.

(21) Appl. No.: 12/767,255

(22) Filed: Apr. 26, 2010

(65) Prior Publication Data

US 2010/0256832 A1 Oct. 7, 2010

Related U.S. Application Data

(63) Continuation of application No. PCT/EP2008/064510, filed on Oct. 27, 2008.

(60) Provisional application No. 60/996,036, filed on Oct. 25, 2007.

(51) Int. Cl.
  *G06F 1/28* (2006.01)
  *H02H 7/26* (2006.01)

(52) U.S. Cl.
  CPC .............. *H02H 7/261* (2013.01); *Y02E 60/723* (2013.01); *Y04S 10/16* (2013.01)

(58) Field of Classification Search
  USPC ........................................................ 700/286
  See application file for complete search history.

(56) References Cited

U.S. PATENT DOCUMENTS

| | | |
|---|---|---|
| 4,767,941 A | 8/1988 | Brand et al. |
| 5,963,734 A * | 10/1999 | Ackerman et al. ............. 703/18 |
| 2002/0059477 A1 | 5/2002 | Wimmer et al. |
| 2002/0173927 A1 | 11/2002 | Vandiver |
| 2008/0103631 A1* | 5/2008 | Koliwad et al. ............. 700/286 |
| 2008/0244044 A1 | 10/2008 | Wimmer |
| 2009/0070062 A1 | 3/2009 | Kirrmann et al. |

FOREIGN PATENT DOCUMENTS

| | | |
|---|---|---|
| DE | 3812072 A1 | 10/1989 |
| DE | 19541147 C1 | 6/1997 |
| EP | 1 850 142 A1 | 10/2007 |
| EP | 1 976 177 A1 | 10/2008 |

OTHER PUBLICATIONS

International Search Report for PCT/EP2008/064510 completed Jan. 27, 2009.
Written Opinion for PCT/EP2008/064510 completed Jan. 27, 2009.
(Continued)

*Primary Examiner* — Carlos Ortiz Rodriguez
(74) *Attorney, Agent, or Firm* — Taft Stettinius & Hollister LLP

(57) ABSTRACT

A method and system are provided for operation of substations in which protection, control and measurement devices (e.g., Intelligent Electronic Devices (IEDs)) exchange operational data over a data network, for example, according to IEC standard 61850. During maintenance, commissioning and fault situations, when one or several IEDs are inoperable, the data that these IEDs would have produced is substituted to ensure availability of the substation. To this effect, a dedicated substitute device is permanently installed that can take the role of any IED, and that is automatically configured out of a standard configuration description (SCD) file that describes the SA system.

15 Claims, 2 Drawing Sheets

(56) References Cited

OTHER PUBLICATIONS

F. Crispino et al., An experiment using an Object-oriented standard—IEC 61850 to integrate IEDs Systems in Substations, Transmission & Distribution Conference & Exposition; Latin America, 2004, pp. 22-27.

Nhat Nguyen-Dinh et al., A Study on GOOSE Communication based on IEC 61850 using MMS Ease Lite, International Conference on Control, Automation and Systems 2007, Seoul, Korea, pp. 1873-1877.

International Search Report issued in PCT/EP2008/064016 dated Jan. 20, 2009.

Written Opinion issued in PCT/EP2008/064016 dated Jan. 20, 2009.

European Search Report issued in EP 08151245.1 dated Jul. 22, 2008.

Sachdev, et al., A Computer-Aided Technique for Generating Substation Interlocking Schemes, IEEE Transactions on Power Delivery vol. 15, No. 2, Apr. 2000 pp. 538-544.

Duan et al., Study on Substation Control Interlocking Combined with PKI/PMI Based Access Security Method, International Conference on Power System Tecyhnology, 2006, pp. 1-6.

\* cited by examiner

OPERATING A SUBSTATION AUTOMATION SYSTEM

RELATED APPLICATION

This application is a continuation application under 35 U.S.C. §120 of PCT/EP2008/064510 filed as an International Application on Oct. 27, 2008 designating the U.S., which claims the benefit under 35 U.S.C. §119 of U.S. Provisional Patent No. 60/996,036 filed on Oct. 25, 2007, the entire contents of which are hereby incorporated by reference in their entireties.

FIELD

The present disclosure relates to the field of Substation Automation (SA) systems for substations in high and medium voltage electric power networks. More particularly, the present disclosure relates to the operation of a SA system and/or a substation with missing devices.

BACKGROUND INFORMATION

Substations in high and medium-voltage power networks include primary devices such as electrical cables, lines, bus bars, switches, power transformers and instrument transformers, which are generally arranged in switch yards and/or bays. These primary devices are operated in an automated way via a SA system. The SA system includes secondary devices, which can include Intelligent Electronic Devices (IED) that are responsible for protection, control and monitoring of the primary devices. The secondary devices may be assigned to hierarchical levels, such as the station level, the bay level, and the process level, where the process level is separated from the bay level by a so-called process interface. The station level of the SA system can include a supervisory computer which has an Operator Work Station (OWS) with a Human-Machine Interface (HMI) and executes a Supervisory Control And Data Acquisition (SCADA) software program, as well as a gateway that communicates the state of the substation to a Network Control Centre (NCC) and receives commands from the NCC. IEDs on the bay level, which may also be referred to as bay units or protection IEDs hereinafter, in turn are connected to each other as well as to the IEDs on the station level via an inter-bay or station bus serving the purpose of exchanging commands and status information.

Secondary devices on the process-level can include (i) sensors for voltage (VT), current (CT) and gas density measurements, (ii) contact probes for sensing switch and transformer tap changer positions, and/or (iii) actuators (I/O) for changing transformer tap positions, or for controlling switchgear like circuit breakers or disconnectors. Exemplary sensors such as non-conventional current or voltage transformers include an Analog-to-Digital (A/D) converter for sampling of analog signals, and are connected to the bay units via a dedicated or intra-bay process bus, which can be considered as the process interface replacing the conventional hard-wired process interface. The conventional hard-wired process interface connects conventional current or voltage transformers in the switchyard to the bay level equipment via dedicated copper wires, in which case the analog signals of the instrument transformers are sampled by the bay units.

A communication standard for communication between the secondary devices of a substation has been introduced by the International Electrotechnical Committee (IEC) as part of the standard IEC 61850 entitled "Communication Networks and Systems in Substations". For non-time critical messages, IEC 61850-8-1 specifies the Manufacturing Message Specification (MMS, ISO/IEC 9506) protocol based on a reduced Open Systems Interconnection (OSI) protocol stack which is built upon the Transmission Control Protocol (TCP) and Internet Protocol (IP) in the transport and network layer, respectively, and upon Ethernet and/or RS-232C as physical media. For time-critical event-based messages, IEC 61850-8-1 specifies the Generic Object Oriented Substation Events (GOOSE) directly on the Ethernet link layer of the communication stack. For fast periodically changing signals at the process level, such as measured analog voltages or currents, IEC 61850-9-2 specifies the Sampled Value (SV) service, which, similar to GOOSE, builds directly on the Ethernet link layer. Hence, the standard defines a format to publish, as multicast messages on an industrial Ethernet, event-based messages and digitized measurement data from current or voltage sensors on the process level as a substitute to traditional copper wiring.

In short, an IED controls actuators of assigned primary devices on the basis of signals from assigned sensors for switch or tap changer position, temperature, voltage, current etc., signals from other IEDs, and signals from the supervisory system. Conversely, an IED communicates a state or behavior of its assigned primary devices (e.g., selected sensor readings) to other IEDs and/or to the supervisory system. The signals are preferably transmitted as network messages, for instance according to IEC 61850-8-1 or IEC 61850-9-2 messages as discussed above.

In a protection mode, a Protection, Control and Measurement (PCM) IED monitors the state of a substation or of a part thereof and autonomously opens an assigned circuit breaker in case the PCM IED detects a potentially dangerous situation such as an overload. In a control mode, the PCM IED executes commands from the supervisory level, such as opening and closing assigned switching elements.

In a "select before operate" sequence, an operator may reserve a switching device for operation and ask the PCM IED, by way of a switching request, to execute a particular close or open operation on a particular switch. The assigned PCM IED may then accept or refuse such a command depending on the electrical state of the attached lines in order to prevent a hazardous or damaging operation, such as connecting a live bus bar to earth. This safety mechanism is called interlocking. In IEC 61850-enabled substations, the interlocking information is transmitted over the communication network, whereas the interlocking information was previously conveyed via copper wires.

The logic implementing the interlocking can be programmed as Boolean expressions in tabular, code or function chart language on each PCM IED individually during the engineering phase of a substation project, which requires both time and considerable experience as well as a perfect knowledge of the substation topology. Parts of the interlocking logic are "compiled" and included in the function chart type logic on the PCM IEDs. This engineering process is normally done on the basis of a fixed substation topology, and requires substantial changes in case, for instance, of an extension of an existing substation.

On the other hand, when a substation is commissioned, extended or maintained, some parts of the substation may be disabled, removed, in repair or may not yet have been installed. This especially applies to substations that are built in slices, with foreseen future extensions, sometimes years later. To avoid re-engineering the interlocking logic, bridging of conventional copper wiring provides for a possibility to substitute or otherwise account for missing parts of the substation. However, bridging the wires is not possible any longer when data exchange relies on IEC 61850-like network communication, since the position of a missing or otherwise disconnected switch is not transmitted at all and is tagged as "invalid" by all recipients, thus possibly impeding operation of the recipients. Nevertheless, the position or any other status information of the missing switch can still be forced, or substituted, by a supervisory computer sending unicast MMS commands individually to each concerned IED of the SA system. This operation is manual and error-prone, and involves ensuring that all forced values are returned to real values upon re-integration of the missing substation parts. Likewise, missing bays or secondary devices do not appear in the OWS or in the gateway, but to distinguish this situation from a fault situation, the SCADA software tags these objects as "substituted" and assigns them a convenient value. Such substitutions are recorded in the substation log, but such logging cannot prevent a critical situation.

European Patent Application EP-A 1850142 is concerned with the testing of system level functionality involving several Protection, Control and Measurement (PCM) IEDs of an SA system for IEC 61850 compliant substations. An extensive testing of all conceivable control or protection functions/applications of an extended SA system, including a large number of IEDs with a multitude of configurations, is facilitated by simulating at least one of the IEDs in a testing device. Hence, only a limited number of IEDs are physically present as individual devices in a test environment, and the behavior of at least one further IED is simulated by a dedicated testing device with appropriate data processing means. The testing device sends network messages indicative of the behavior of the simulated IED according to its communication and device configuration over a substation communication network to the physically present IED to be tested. The proper working of the configured IED functions (e.g., the expected correct action as triggered by the testing device) are then verified by analyzing the device's response over its analog and digital outputs, as well as its response over the communication network.

SUMMARY

An exemplary embodiment provides a method of operating a Substation Automation (SA) system, which includes first and second Intelligent Electronic Devices (IEDs) connected to a communication network, with a standardized configuration description, and operating a substation of an electric power system with first and second primary devices. The exemplary method includes representing in the SA system, by the second IED, a second primary device of the substation which is disconnected from the SA system. The representation by the second IED includes i) simulating operational data including at least one of status information and process values from the second primary device, and ii) generating and transmitting over the communication network, a multicast network message including the simulated operational data. The exemplary method also includes receiving and evaluating, by the first IED, the network message, and controlling a first switching device of the substation in response the received and evaluated network message.

An exemplary embodiment provides a Substation Automation (SA) system with a standardized configuration description. The exemplary SA system includes a communication network, and first and second Intelligent Electronic Devices (IED) connected to the communication network. The second IED is configured to represent, in the SA system, a second primary device of a substation which is disconnected from the SA system. The second IED is configured to, in representing the second primary device, is configured to i) simulate operational data comprising at least one of status information and process values from the second primary device, and ii) generate and transmit over the communication network a multicast network message including the simulated operational data. The first IED is configured to receive and evaluate the network message, and to control a first switching device of the substation in response the received and evaluated network message.

An exemplary embodiment provides a computer-readable recording medium having a computer program recorded thereon that causes a first IED of a Substation Automation (SA) system to facilitate operation of the SA system, which includes the first IED, a second IED, and first and second primary devices of a substation of an electric power system. The program causes the first IED to execute an operation of representing, in the SA system, a second primary device of the substation which is disconnected from the SA system. The representation includes i) simulating operational data including at least one of status information and process values from the second primary device, and ii) generating a multicast network message including the simulated operational data. The program also causes the first IED to execute an operation of transmitting the generated network message to the second IED for evaluation of the network message, and controlling a first switching device of the substation in response the evaluated network message.

BRIEF DESCRIPTION OF THE DRAWINGS

Additional refinements, advantages and features of the present disclosure are described in more detail below with reference to exemplary embodiments illustrated in the drawings, in which.

The reference symbols used in the drawings, and their meanings, are listed in summary form in the list of reference symbols. In principle, identical parts are provided with the same reference symbols in the figures.

DETAILED DESCRIPTION

Figure 1:
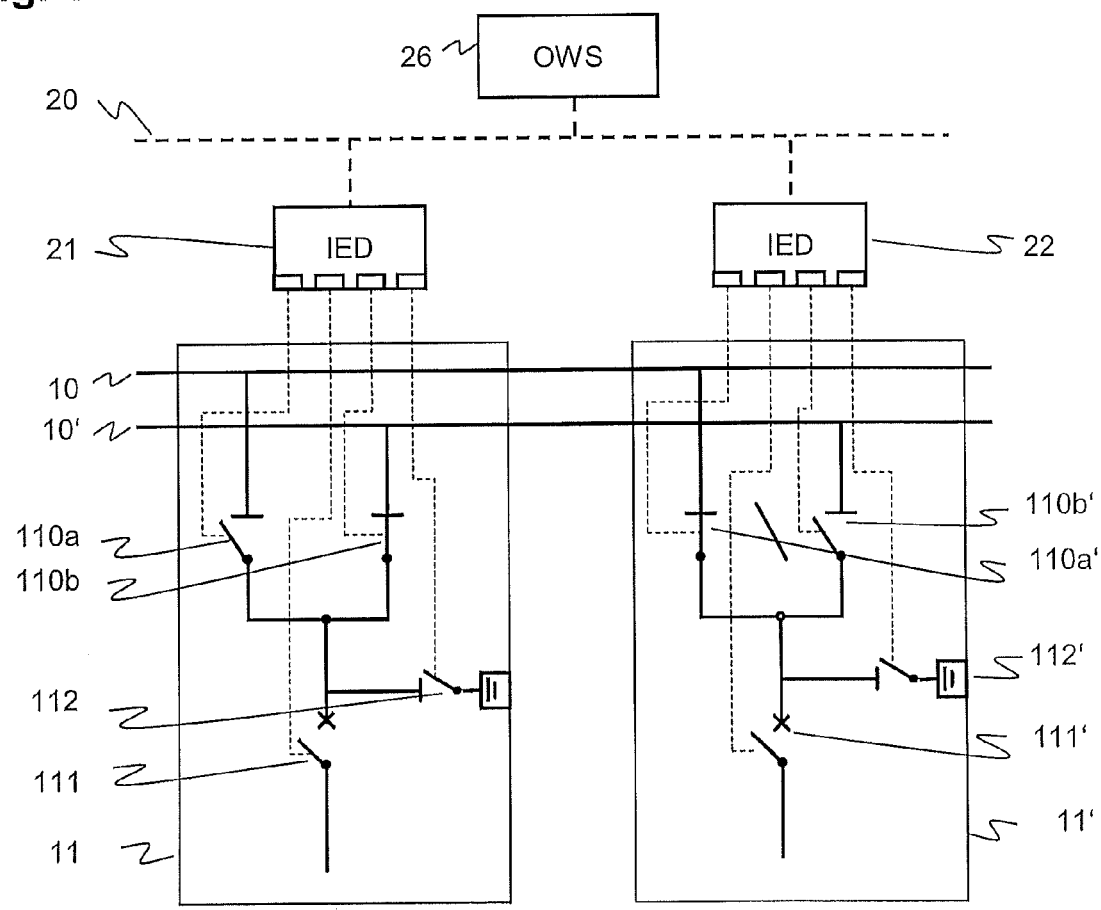
FIG. 1 schematically shows a single line diagram of part of an exemplary substation.

An exemplary embodiment of the present disclosure enable a continued operation of a substation of an electric power system despite the occurrence of operational data missing from a piece of primary equipment of the substation.

According to an exemplary embodiment of the present disclosure, an operating SA system is provided with a substitute, or second, Intelligent Electronic Device (IED) dedicated and configured to simulate operational data of a piece of a primary substation equipment, wherein the operational data and/or primary equipment are otherwise not represented in the SA system. The piece of primary equipment concerned may be in-operational or disconnected from the SA system, either temporarily during service or replacement, or permanently until commissioning in the near future. Likewise, a particular secondary device formally assigned to the primary substation equipment may not be available for the same reasons and thus be at the origin of the missing representation of the primary equipment in the SA system.

The simulated operational data may include status information and/or process values assigned to the unrepresented piece of primary substation equipment and substituting real data determined by a sensor connected to the piece of primary equipment.

The aforementioned simulated operational data values correspond to a state of the substation which allows safe operation of the primary devices that are properly represented in the SA system. To that end, the substitute IED is likewise configured to generate multicast network messages which are indicative of the simulated or hypothetical, as opposed to a real or actual, operational state and/or status of the primary devices, and to distribute these messages to other IEDs of the SA system. Finally, the latter will take the simulated information into account when addressing the primary devices properly represented in, and controlled by, the SA system. Configuration, by the substitute IED, of a single multicast message, for example, a GOOSE type-message, is less error prone than a configuration, by an operator, of a plurality of MMS messages.

Exemplary embodiments of the present disclosure take advantage of the IEC 61850 protocol for measurement, protection and control functions, according to which the behavior of the primary devices is only visible through the communication network replacing conventional copper wirings. The configuration of the substation, including any presently disabled, removed, or not yet installed elements, is specified in a standardized configuration description such as the Substation Configuration Description (SCD) file which is read and analyzed by the substitute IED. This file contains all the characteristics of the substation elements, including a network identifier, such as an IP address, for example, of the particular secondary device formally assigned to the primary substation equipment. Hence, the substitute IED can simulate unrepresented equipment by generating the same binary (e.g., switch position, status indicators) and analog (e.g., voltage, current) values as obtainable from operating equipment, and distribute them as network messages, e.g. as Generic Object Oriented Substation Events (GOOSE) over the SA communication network.

In an exemplary embodiment, the absence of operational data in case of a replacement or service of a previously operational piece of primary equipment or IED formally assigned thereto is detected via missing GOOSE messages. To this end, the communication network traffic is continuously monitored, by the substitute IED itself, for example, and missing messages are identified via a time-out mechanism, for example. The substitution can then be activated automatically, but since this is a potentially dangerous operation, it should be previously enabled by a properly authorized operator.

In accordance with an exemplary embodiment of the present disclosure, the simulation and distribution of status information and/or process values by the substitute IED is discontinued upon (re-) integration of an IED formally assigned to the piece of primary equipment and hosting Logical Nodes of the latter. The reintegration of the original IED can be detected, by the substitute IED itself, for example, via duplication of an IP and/or MAC address, subsequently leading to the deactivation of the substitution.

In accordance with an exemplary embodiment directed to a sequential commissioning of entire bays of a substation or a replacement of entire bays during operation, the substitute IED may generate the signals corresponding to a plurality of further IEDs, and actually emulate the entire bay of the substation.

The substitute IED can become integrated into or a part of the supervisory computer or of another device on the communication network. The substitute IED can even replace the Operator Workstation (OWS) provided that the information contained in the Substation Configuration Description (SCD, according to the IEC61850 standard, for example) provides acceptable functionality of the display. On the other hand, if a dedicated, permanently active substitute IED is provided, some emergency or maintenance control function can be executed by the substitute IED as a backup to the OWS. To this effect, the substitute IED may also include a stable, permanent storage (e.g., computer-readable recording medium) for the process values, such as for the state of the primary switching equipment, as well as other event logs, for example.

FIG. 1 shows a single line diagram of a part or section of an exemplary substation at an assumed voltage level of 110 kV, for example, as well as an exemplary SA system and/or secondary equipment. The model of a switch yard at the single line level contains a topological representation of various electrical connections between primary equipment. The substation comprises a double bus bar configuration with two bus bars 10, 10', which feed two bays 11, 11' via disconnectors 110a, 110b and 11a', 110'b, respectively. Each bay 11, 11' includes a circuit breaker 111, 111' and an earthing switch 112, 112', respectively. As illustrated in the example of FIG. 1, the corresponding excerpt of the SA system depicts, in broken lines, a communication network 20 and two IEDs 21, 22, which both host logical nodes of class CSWI (switch control). Each logical node is allocated to one of the aforementioned switching devices 110a to 112' as indicated by the thin broken lines in FIG. 1. An Operator Work Station (OWS) 26 is also depicted.

A simple aspect of interlocking prevents the disconnectors 110 and circuit breaker 111 from closing as long as earthing switch 112 connects the attached lines to ground. Hence, in order to prevent a hazardous or damaging operation, such as connecting a live bus bar to earth, a corresponding command would be refused. Likewise, disconnector 110a is not to be opened while disconnector 110b is being closed, i.e., interaction between two switching processes is to be avoided. When considering several bays, disconnector 110a may not be closed as long as disconnector 110a' and other disconnectors connected to busbar 10 are not open, since current could otherwise flow from busbar 10 to busbar 10'.

Figure 2:
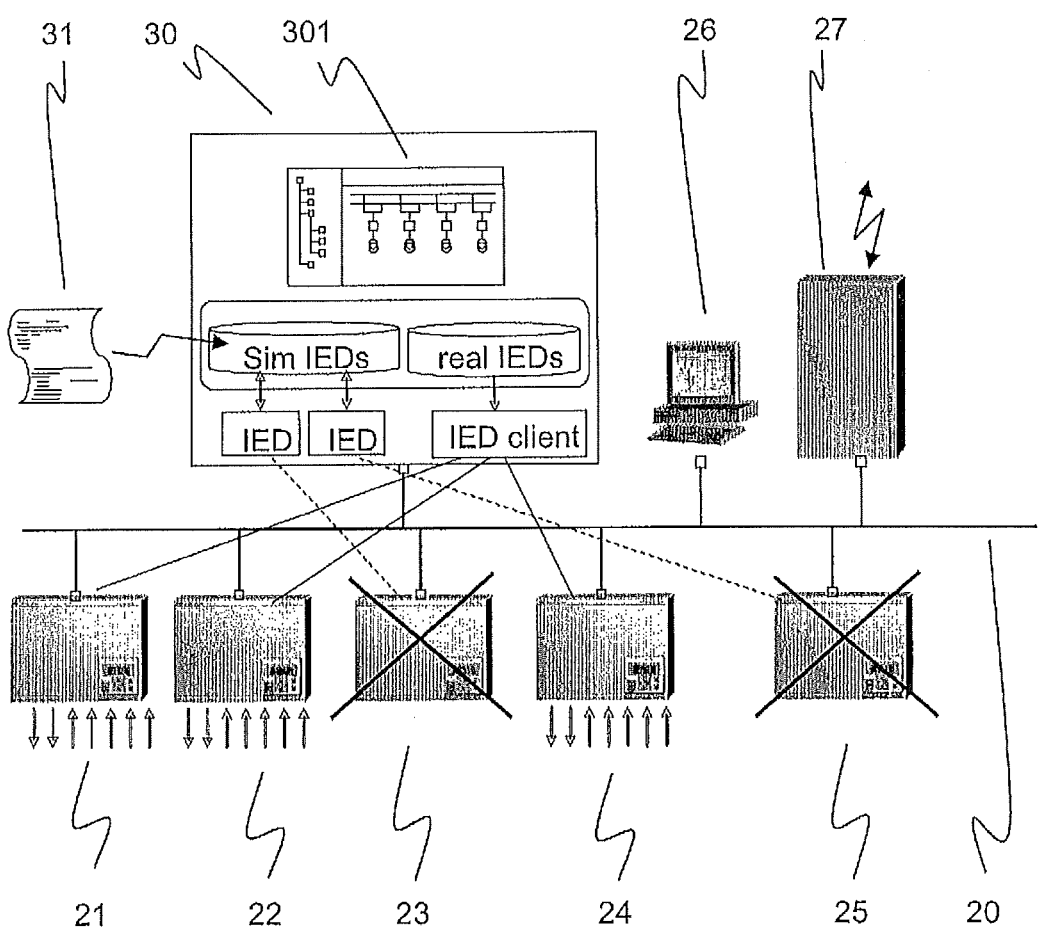
FIG. 2 shows an exemplary SA system with two missing IEDs and a substitute IED.

FIG. 2 shows an exemplary SA system with three IEDs 21, 22, 24 connected to SA communication network 20 and exchanging physical signals with the primary equipment of the substation as indicated by the vertical arrows beneath the IEDs. Two IEDs 23, 25, or the assigned source/sink of the physical signals, respectively, are likewise part of the SA system, but are presently missing or inaccessible. Exemplary station level equipment that is connected to the communication network includes OWS 26 and gateway 27. All IEDs 21-25 of the SA system have their counterpart configuration description in the SCD file 31 of the SA system. Substitute IED 30 is also connected to the SA communication network 20 and has dedicated processing means for simulating or emulating the missing IED 23, 25 (dashed lines) on the basis of the SCD file 31, or a suitable excerpt thereof. According to an exemplary embodiment, the processing means of the substitute IED 30 may include a computer having a processor configured to execute a computer-readable program and/or computer-readable instructions recorded on a computer-readable recording medium (e.g., non-volatile memory, such as a ROM, hard disk drive, optical memory, flash memory, etc.).

For example, the substitute IED 30 may be part of an OWS or SCADA system or otherwise offer extended functionality such as Graphical User Interface (GUI) 301. The GUI 301 enables an operator to easily select which ones of the IED depicted are to be simulated or are not to be simulated. In the illustrated example, the simulated IEDs 23, 25 are configured on the substitute IED 30, whereas the real IEDs 21, 22, 24 are accessed via their MMS server.

According to an exemplary embodiment, the substitute IED may be a personal computer (PC) with sufficient processing capacity and running Windows or another operating system. The substitute IED is installed permanently in the substation and subject to the same installation requirements as Protection Control Monitoring (PCM) IEDs. For example, the substitute IED must be able to start up automatically and recover in case of power loss or other problems. To this effect, the substitute IED keeps the simulated process values of the substation in stable storage, hard disk or other, and reinitiates them at start-up (e.g., after recovering from a power outage). The substitute IED also monitors the information from the real IEDs in order to generate time-synchronized and topology-consistent sets of values.

The substitute IED can also be used for operator training or commissioning, by representing state sequences and data streams of non-existing devices. To this effect, the substitute IED responds to commands like the real device would do, obeying the interlocking rules that are generated out of its description of the substation topography as contained in the SCD file 31, and responding to Select-Before-Operate commands. In addition, the substitute IED may execute an operation with a script that mimics the behavior of the primary equipment and especially simulate error conditions.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF DESIGNATIONS

10 bus bar
11 bay
110 disconnector
111 circuit breaker
112 earthing switch
20 SA communication network
21-25 Intelligent Electronic Device (IED)
26 operator work station (OWS)
27 gateway
30 substitute IED
31 SCD file
301 graphical user interface (GUI)

What is claimed is:

1. A method of operating a Substation Automation (SA) system, which includes first and second Intelligent Electronic Devices (IEDs) connected to a communication network, with a standardized configuration description, and operating a substation of an electric power system with first and second primary devices, the method comprising:
   representing in the SA system, by the second IED, a second primary device of the substation which is disconnected from the SA system, the representation including
   i) simulating operational data including at least one of status information and process values from the second primary device, and
   ii) generating and transmitting over the communication network, a multicast network message including the simulated operational data; and
   receiving and evaluating, by the first IED, the network message, and controlling a first switching device of the substation in response to the received and evaluated network message.

2. The method according to claim 1, comprising, prior to the generation of network messages by the second IED:
   continuously monitoring the communication network; and
   identifying missing network messages comprising operational data from the second primary device.

3. The method according to claim 1, comprising:
   integrating into the SA system a third IED assigned to the second primary device; and
   disrupting the generation and transmission, by the second IED, of the multicast network message including operational data from the second primary device of the substation.

4. The method according to claim 1, comprising:
   generating, by the second IED, network messages which are indicative of a state of an entire bay of the substation.

5. The method according to claim 1, comprising:
   storing, by the second IED, operational data of the second primary device indicated by a multicast network message previously transmitted over the communication network.

6. The method according to claim 1, comprising:
   determining, by the first IED, an interlocking status indicating at least one of a release and blocking property of the first switching device, based on at least one of (i) a dynamic substation topology including a status of the second primary device and (ii) interlocking rules.

7. A Substation Automation (SA) system with a standardized configuration description, comprising:
   a communication network;
   first and second Intelligent Electronic Devices (IED) connected to the communication network, the second IED being configured to represent, in the SA system, a second primary device of a substation which is disconnected from the SA system,
   wherein the second IED is configured to, in representing the second primary device
   i) simulate operational data comprising at least one of status information and process values from the second primary device, and
   ii) generate and transmit over the communication network a multicast network message including the simulated operational data, and
   wherein the first IED is configured to receive and evaluate the network message, and to control a first switching device of the substation in response to the received and evaluated network message.

8. The SA system according to claim 7, wherein the second IED is configured to continuously monitor the communication network and to identify missing network messages comprising operational data from the second primary device.

9. The SA system according to claim 7, wherein the second IED is configured to, following integration into the SA system of a third IED assigned to the second primary device, disrupt the generation and transmission, by the second IED, of the multicast network message including operational data from the second primary device of the substation.

10. The SA system according to claim 7, comprising:
memory means for storing operational data of the second primary device indicated by a multicast network message previously transmitted over the communication network.

11. The method according to claim 1, wherein the second IED exclusively represents the second primary device in the SA system.

12. The SA system according to claim 7, wherein the second IED is configured to exclusively represent the second primary device in the SA system.

13. A non-transitory computer-readable recording medium having a computer program recorded thereon that causes a first IED of a Substation Automation (SA) system to facilitate operation of the SA system, which includes the first IED, a second IED, and first and second primary devices of a substation of an electric power system, the program causing the first IED to execute operations comprising:

representing, in the SA system, a second primary device of the substation which is disconnected from the SA system, the representation including
i) simulating operational data including at least one of status information and process values from the second primary device, and
ii) generating a multicast network message including the simulated operational data; and
transmitting the generated network message to the second IED for evaluation of the network message, and controlling a first switching device of the substation in response to the evaluated network message.

14. The non-transitory computer-readable recording medium according to claim 13, wherein the program causes the first IED to exclusively represent the second primary device in the SA system.

15. The non-transitory computer-readable recording medium according to claim 13, wherein the SA system comprises a standardized configuration description which describes operations of the SA system.

* * * * *